United States Patent

Nakaie et al.

[11] Patent Number: 6,029,510
[45] Date of Patent: Feb. 29, 2000

[54] ROTARY THROTTLE POSITION SENSOR

[75] Inventors: Takeo Nakaie; Keiichi Asai; Kazuyuki Tsujioka; Satoshi Komatsu, all of Fukui, Japan

[73] Assignee: Matsushita Electric Industrial Co., Ltd., Osaka, Japan

[21] Appl. No.: 08/894,805

[22] PCT Filed: Oct. 10, 1997

[86] PCT No.: PCT/JP97/00043

§ 371 Date: Oct. 28, 1997

§ 102(e) Date: Oct. 28, 1997

[87] PCT Pub. No.: WO97/25589

PCT Pub. Date: Jul. 17, 1997

[30] Foreign Application Priority Data

| Jan. 10, 1996 | [JP] | Japan | 8-001996 |
| Jan. 29, 1996 | [JP] | Japan | 8-012549 |
| Feb. 1, 1996 | [JP] | Japan | 8-016315 |
| Feb. 19, 1996 | [JP] | Japan | 8-030289 |

[51] Int. Cl.[7] .................................................. G01M 15/00
[52] U.S. Cl. ........................................................ 73/118.1
[58] Field of Search ............................. 73/118.1, 118.2, 73/112, 113, 116, 117.2, 117.3

[56] References Cited

U.S. PATENT DOCUMENTS

| 4,989,451 | 2/1991 | Ogawa et al. | 73/118.1 |
| 5,460,035 | 10/1995 | Pfaffenberger . | |
| 5,520,044 | 5/1996 | Pfaffenberger | 73/118.1 |
| 5,539,373 | 7/1996 | Pfaffenberger et al. | 73/118.1 |
| 5,567,874 | 10/1996 | Suzuki et al. | 73/118.2 |
| 5,571,960 | 11/1996 | Tateishi et al. | 73/118.2 |
| 5,661,890 | 9/1997 | Pfaffenberger | 29/426.6 |
| 5,672,818 | 9/1997 | Schaefer et al. | 73/118.2 |
| 5,736,635 | 4/1998 | Onodera | 73/118.2 |
| 5,738,072 | 4/1998 | Bolte et al. | 73/118.1 |
| 5,743,132 | 4/1998 | Hosoya et al. | 73/118.2 |

FOREIGN PATENT DOCUMENTS

| 62-965505 | 6/1987 | Japan . |
| 6-37705 | 5/1994 | Japan . |
| 7-151508 | 6/1995 | Japan . |

Primary Examiner—Eric S. McCall
Attorney, Agent, or Firm—McDermott, Will & Emery

[57] ABSTRACT

The present invention is related to a rotary throttle position sensor for detecting the position of throttle shaft of internal combustion engine, and aims to increase the reliability in installation on a throttle shaft. The rotor prior to installation is provisionally retained in position to always ensure the initial point of rotation by making a protrusion provided on rotor touch and ride over a protrusion provided on the cover, thereby the rotor is pressed to the case when the cover is assembled on the case.

21 Claims, 9 Drawing Sheets

ROTARY THROTTLE POSITION SENSOR

TECHNICAL FIELD

This invention is related to a rotary throttle position sensor for detecting the position of a rotary throttle shaft of an internal combustion engine.

BACKGROUND ART

Many internal combustion engines for cars and vehicles use a throttle valve to control the amount of air entering the engine. The throttle valve may be opened to provide unimpeded air intake through a throttle body. Alternatively, the throttle valve may be closed to greatly restrict the passage of air. By controlling the amount of air the throttle valve forms part of the primary engine speed control. The throttle valve may be mechanically linked to an accelerator pedal to be opened or closed according to the pedal position of the accelerator.

Examples of conventional rotary throttle position sensors include Japanese Patent Kokai 7-151508.

Figure 9A:
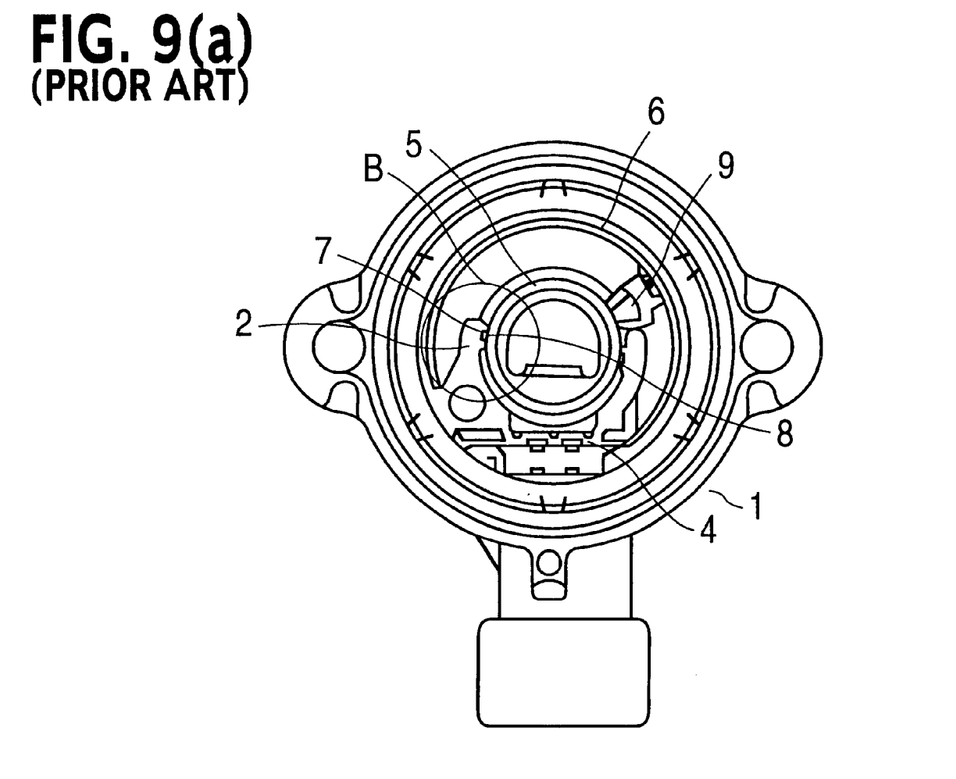
FIG. 9(a) is a bottom view of a prior art rotary throttle position sensor with the cover removed.
Figure 9B:
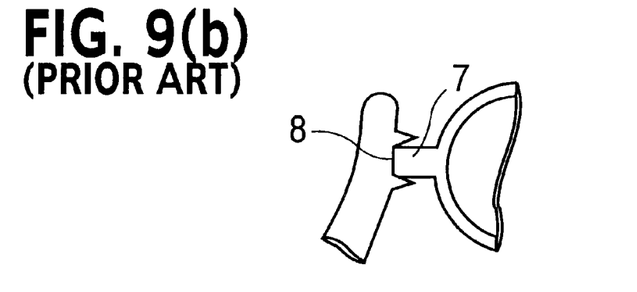
FIG. 9(b) is an enlarged view showing a key portion of the prior art sensor.
Figure 10:
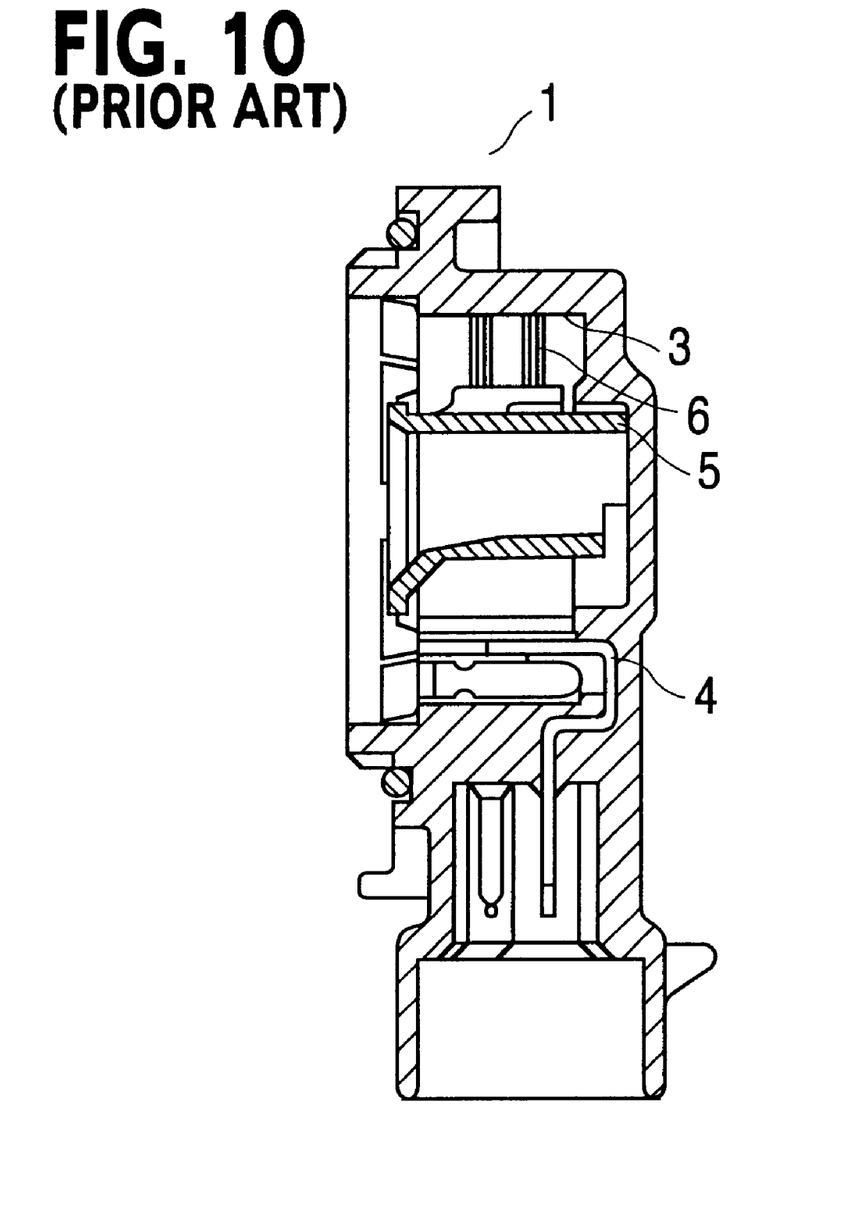
FIG. 10 is a cross sectional side view of the prior art rotary throttle position sensor.

In the following, a conventional rotary throttle position sensor is described referring to drawings. FIG. 9(a) illustrates a conventional rotary throttle position sensor as viewed from the bottom, with the cover removed to make the internal structure visible. FIG. 9(b) is a magnified view showing the key part of FIG. 9(a), rotor and retaining arm. FIG. 10 is a cross sectional view of the conventional rotary throttle position sensor. A cylindrical case 1 having a bottom comprises a retaining arm 2 extending from the inner wall surface towards the centre. A resistive film element 3 forms a resistive pattern(not shown) along the inner wall surface of case 1. A connector terminal 4 for connection with outside the case 1 is electrically coupled to the resistive film element 3. A rotor 5 is provided touching the retaining arm 2 and comprises, at the end of a support block 9, a brush 6 which slides on the resistive pattern of resistive film element 3. The case 1 comprises a pair of retaining arms 2 each having an indentation 8 for engagement with a protrusion 7 provided at the outer periphery of the rotor 5.

The conventional rotary throttle position sensor is assembled during the manufacture with the protrusion 7 engaged with the indentation 8 provided in the retaining arm 2, for setting the brush 6 at a desired initial position.

The above described structure, however, has drawbacks in that, although during manufacture the brush 6 may be aligned to a specified position by inserting the protrusion 7 on the periphery of rotor 5 in the indentation 8 of the retaining arm 2 the manufacturing work while making sure whether the engagement of protrusion 7 with indentation 8 is surely kept or not may be a fairly complicated operation. Furthermore, in a case when the protrusion 7 is erroneously inserted during the manufacture to the indentation 8 the rotor 5 may be positioned eccentric to case 1 already at "as manufactured" stage. If such a rotary throttle position sensor is mounted on a throttle shaft to be sensed, the rotor 5 would be broken or the sensor would not be installed at a desired place of the throttle body.

The present invention addresses the above described drawbacks and aims to present a rotary throttle position sensor that has an improved reliability.

BEST MODE FOR CARRYING OUT THE INVENTION

A rotary throttle position sensor comprises a cylindrical case having a bottom, a resistive element having a resistive pattern provided along the inner wall surface of the case, a connector terminal provided on the inner wall surface of the case for electrically connecting said resistive element to outside, a rotor revolving on the bottom surface of said case provided with a brush which slides on the surface of said resistive pattern of resistive element, and a cover having protrusions for limiting the rotary movement of said rotor in joint operation with a protrusion provided on said rotor and a centre hole for fitting said rotor, which cover to be attached to an open end of the case. Said cover plays a role of determining the initial rotary position of said rotor.

A rotary throttle position sensor wherein said rotor has a cylindrical shape and is provided with an opening for mechanical linkage with a rotary throttle shaft in which a flat surface is formed by partially making the wall thickness thicker from the mouth upto the middle of insertion with the remaining revolving upper sector left round, and a thin wall portion is provided at both sides of the revolving upper sector for absorbing the dimensional difference with respect to a rotary throttle shaft.

A rotary throttle position sensor wherein said case is provided with a guide portion at the inner bottom of said case for guiding the movement of bottom end of said rotor.

A rotary throttle position sensor further comprising a pressure wedge for electrically coupling said connector terminal with said resistive element; which pressure wedge is fitted between said connector terminal and the inner wall surface of said case. The pressure wedge is comprised of a plate disposed in parallel with said inner wall surface and a comb-shaped slit plate for pressing electrode of said resistive element to said connector terminal.

A rotary throttle position sensor wherein the comb tooth of said pressure wedge is provided with a protrusion extending towards said connector terminal.

A rotary throttle position sensor wherein said connector terminal is provided with a hollow corresponding to said protrusion on the comb tooth.

A rotary throttle position sensor wherein said resistive element is comprised of a film substrate on which a resistive pattern is formed and an electrode is provided electrically connected to the resistive pattern.

A rotary throttle position sensor wherein said resistive element is comprised of a film substrate on which a resistive pattern is formed and an electrode is provided electrically connected to the resistive pattern, said case is provided with a pocket groove along the floor of the platform around the inner wall surface of the case for accepting the bottom edge of said substrate of resistive element.

A rotary throttle position sensor wherein the thickness of said substrate of resistive element is thicker at the bottom edge than other part so that it may fit for insertion into said pocket groove.

A rotary throttle position sensor wherein said pocket groove is provided with a tapered surface so that said substrate of resistive element is inserted and leans against the inner wall of said case.

A rotary throttle position sensor comprises a cylindrical case having a bottom provided with a guide portion, a resistive element provided along the inner wall surface of the case, a connector terminal for electrical connection with the end of said resistive element, a rotor supported by said guide portion and provided with a brush which slides on the surface of said resistive element and an indentation in the protrusion extending towards the inner wall surface of said case, a spring hooked by the indentation on said rotor and a protrusion at the bottom of said case, and a cover, which is to be attached to an open end of said case, provided with protrusions for limiting the the rotary movement of said rotor and a centre hole for fitting said rotor.

A rotary throttle position sensor wherein said rotor has a cylindrical shape and is provided with an opening for mechanical linkage with a rotary throttle shaft in which a flat surface is formed by partially making the wall thickness thicker from the mouth upto the middle of insertion with the remaining revolving upper sector left round, and a thin wall portion is provided at both sides of the revolving upper sector for absorbing the dimensional difference with the rotary throttle shaft.

A rotary throttle position sensor further comprising a pressure wedge, disposed between said connector terminal and the inner wall surface of said case, for electrically coupling said connector terminal with said resistive element. Which pressure wedge is comprised of a plate disposed in parallel with said inner wall and a comb-shaped slit plate for pressing electrode of said resistive element to said connector terminal.

A rotary throttle position sensor wherein the comb tooth of said pressure wedge is provided with a protrusion extending towards said connector terminal.

A rotary throttle position sensor wherein said resistive element is comprised of a film substrate on which a resistive pattern is formed and an electrode is provided electrically connected with the resistive pattern.

A rotary throttle position sensor wherein said resistive element is comprised of a film substrate on which a resistive pattern is formed, said case is provided with a pocket groove for accepting the bottom edge of said substrate of resistive element, which pocket groove being disposed in the floor of platform around the inner wall surface of the case.

A rotary throttle position sensor wherein the thickness of said substrate of resistive element is thicker at the bottom edge than other part so that it may fit for insertion into said pocket groove.

(Embodiment 1)

Figure 1:
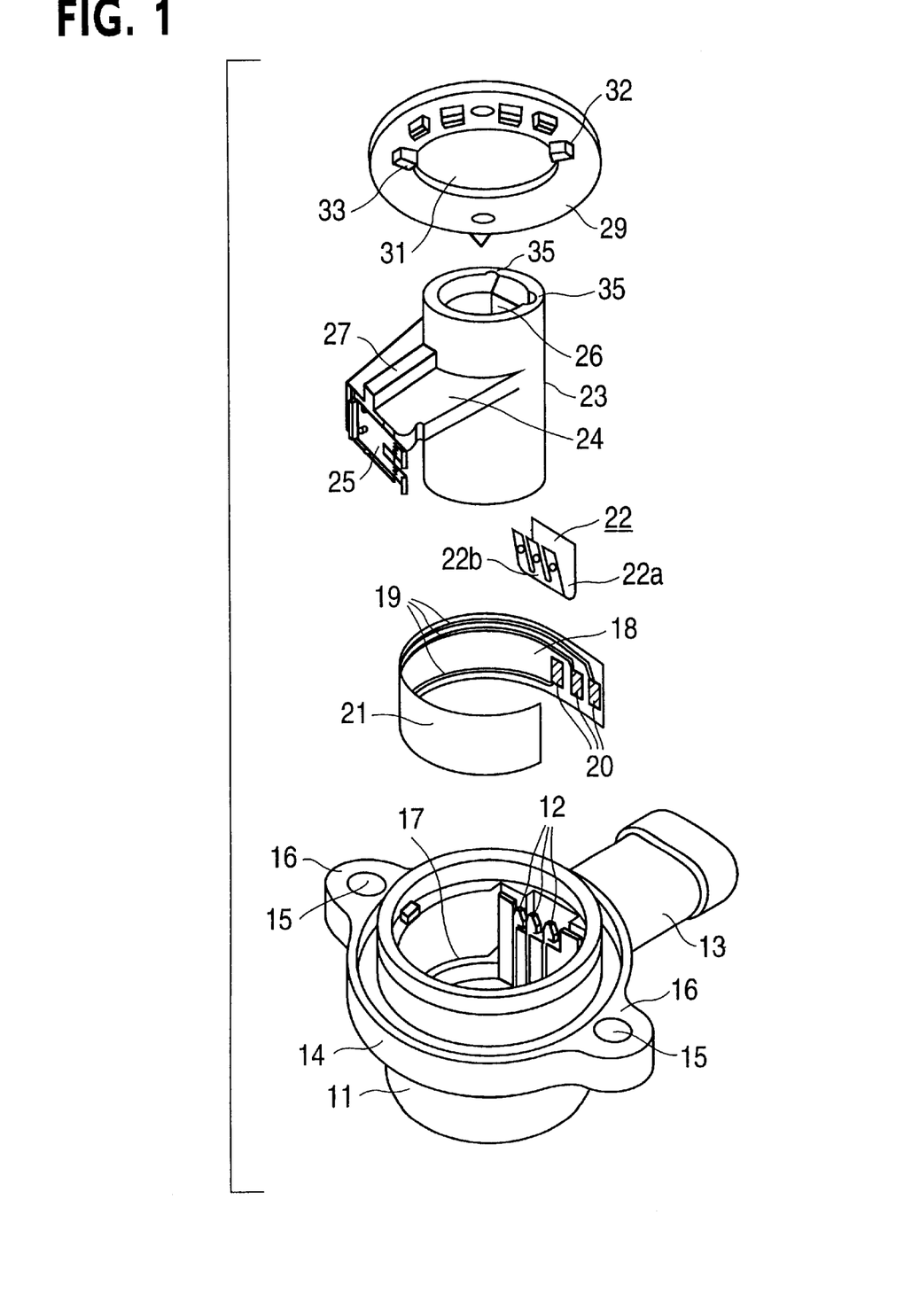
FIG. 1 is a perspective view showing an exploded rotary throttle position sensor according to a first exemplary embodiment of the present invention.
Figure 2:
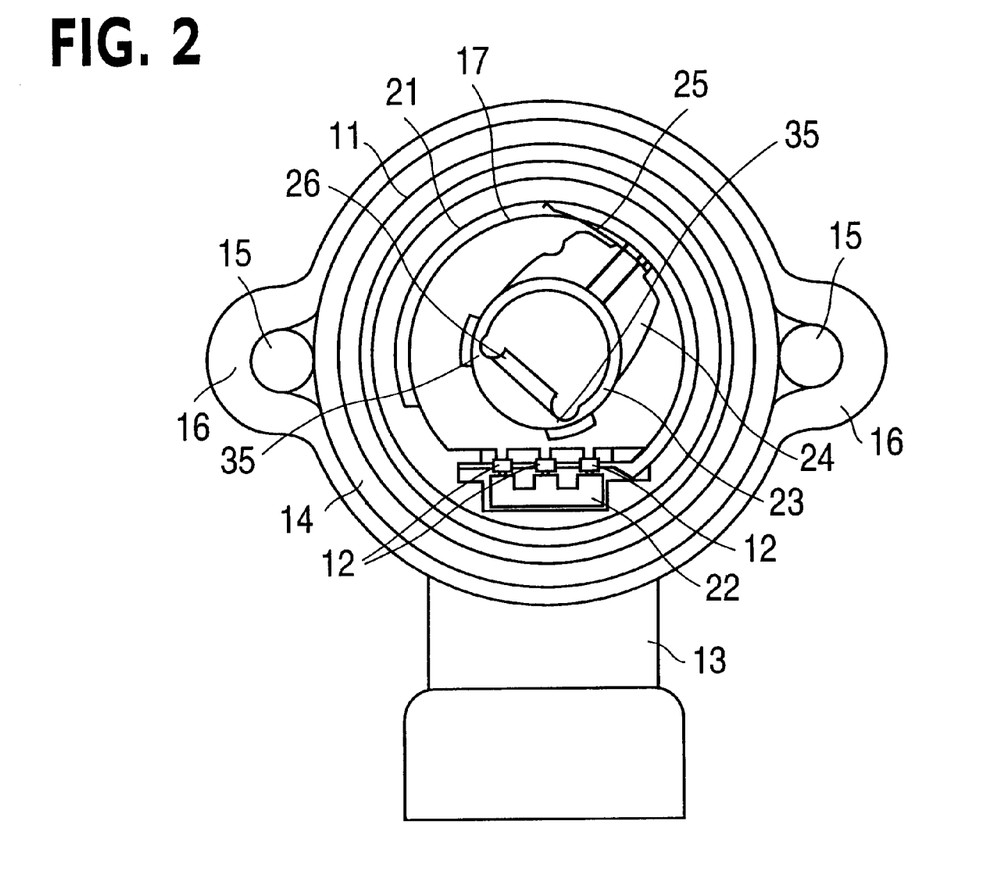
FIG. 2 illustrates the same embodiment as shown in FIG. 1, from a top view with the cover, being a key component, removed.
Figure 3:
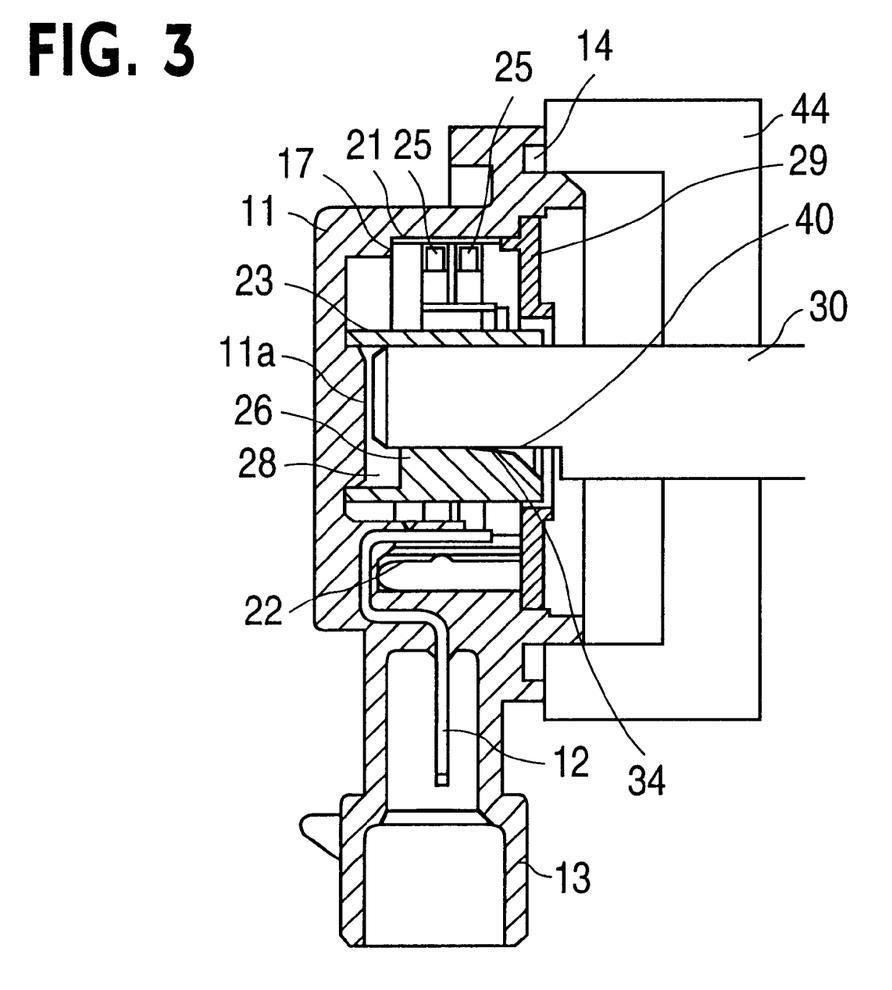
FIG. 3 is a cross sectional view showing the sensor with a throttle shaft mounted in the opening, being a key portion of the sensor.
Figure 4A:
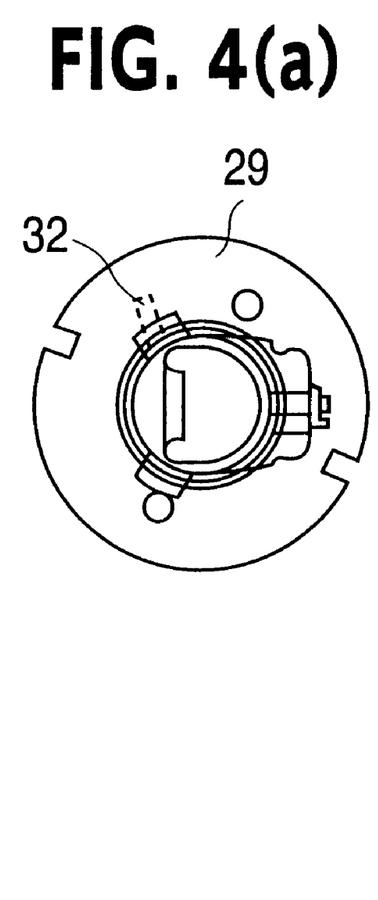
FIG. 4(a) and FIG. 4(b) illustrate the sensor with rotor and cover assembled to it; a top view and a cross sectional side view, respectively.
Figure 4B:
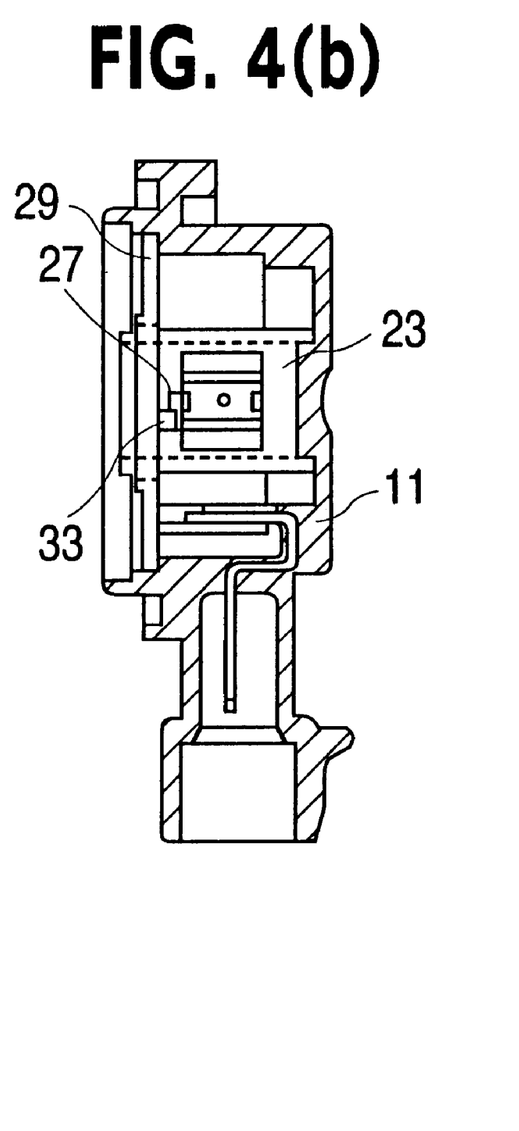
Figures 5A, 5B:
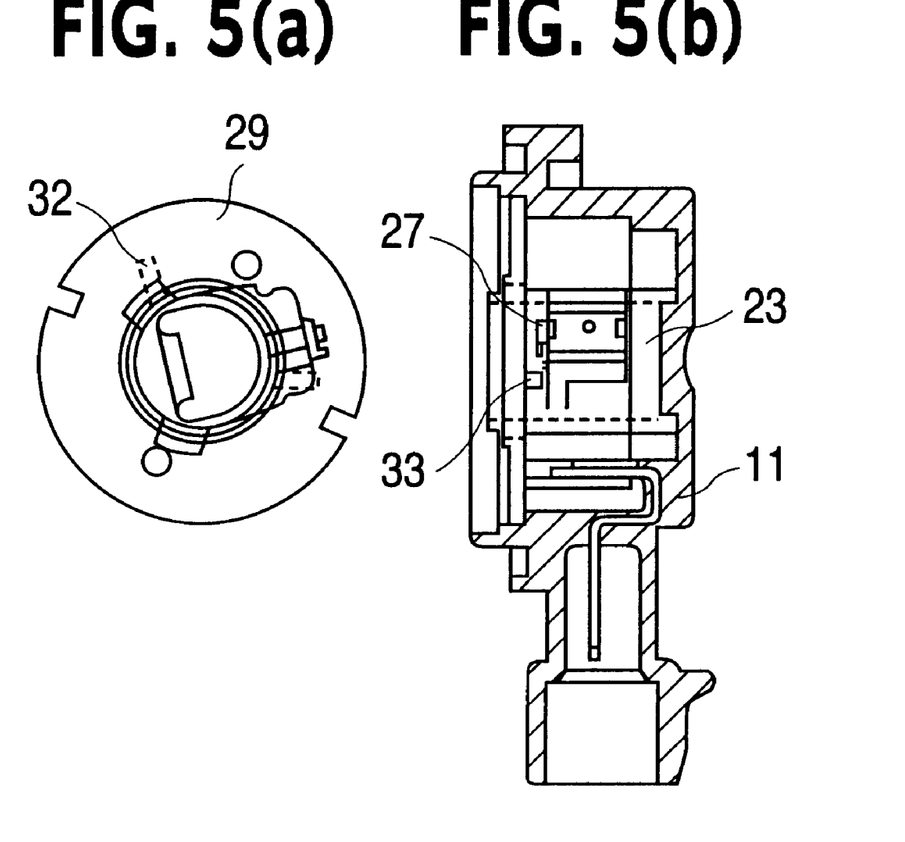
FIG. 5(a) and FIG. 5(b) illustrate other state of the sensor with rotor and cover assembled to it; a top view and a cross sectional side view, respectively.

A first exemplary embodiment of the present invention is described in the following with reference to drawings. FIG. 1 is a perspective view showing an exploded rotary throttle position sensor according to a first exemplary embodiment of the present invention. FIG. 2 illustrates the same embodiment as shown in FIG. 1, from a top view with the cover, being a key component, removed. FIG. 3 is a cross sectional view showing the sensor with a rotary throttle shaft mounted in the opening. FIG. 4(a) and FIG. 4(b) illustrate the sensor in a state when the cover is fixed with protrusion of the cover touching to protrusion of the rotor, a top view and a cross sectional side view, respectively. FIG. 5(a) and FIG. 5(b) illustrate other state of the sensor after installation on a throttle body, when the protrusion of cover is not in contact with the protrusion of rotor, a top view and a cross sectional side view, respectively. In FIGS. 1 through 5, the case 11 has a cylindrical shape with a bottom, made of a glassfiber-mixed heat resistive synthetic resin having sufficient mechanical strength, for example, polybutylene terephthalate. The inner bottom of case 11 is provided with a column-shape guide portion 11a protruding towards the upper opening. The case 11 has three pieces of connector terminals 12 built in by an insert formation for external connection. One end of the connector terminal 12 is exposed in the inside of case 11, while the other end is exposed in the inside of a connector 13 protruding from a periphery of case 11.

The case 11 is provided with a ring-shape flange 14 around the outer periphery, in which flange 14 and ear 16 having hole 15 for installation is provided at counter positions. The case 11 is provided with a platform 17 around the middle of inner wall. Within the case 11, is a resistive element 21 comprised of a substrate of resistive element 18 made of a resin film such as polyimide film. On one surface of substrate 18, three lines of resistive pattern 19 are formed and, at one end of the resistive pattern 19, an electrode 20 for securing electrical contact by touching the connector terminal 12 is formed by printing or other processes.

The resistive element 21 is disposed along the inner wall of case 11 restricted in the up/down direction by the platform 17 with the resistive pattern 19 facing inside, one end of which resistive element 21 is aligned to the connector terminal 12 exposed in the inside of case 11. The connector terminal 12 and the electrode 20 are coupled by the pressure wedge 22 which is made of a metal plate, such as a stainless steel, bent into U shape. The pressure wedge 22, which is comprised of a flat plate and a slit plate 22b having three comb teeth, presses the electrode 20 onto the exposed part of connector terminal 12 to establish the mutual contact. Inside the case 11, a cylindrical rotor 23 made of a glassfiber-mixed synthetic resin, e.g. polybutylene terephthalate, is incorporated. The rotor 23 has a support block 24 protruding from the middle part of outer surface, at the end of the support block 24 is a brush 25 which slides on the resistive pattern 19 linked to the rotation of the rotor 23. Inside the rotor 23 opposite to the support block 24, a revolution orientator 26 is formed by providing a flat plane with a thickened wall. Namely, at the centre of rotor 23 a hole with part of its round shape cut away is provided for mechanical linkage with a rotary throttle shaft 30. The revolution orientator 26 has a tapered surface 34 from the upper to the middle part, extending as a flat surface to face a plane 40 of rotary throttle shaft 30 from the middle to the bottom. At the bottom of rotor 23 is a round opening 28, to which the guide portion 11a of case 11 fits in for holding the rotor. The case 11, in which the resistive element 21, the pressure wedge 22 and the rotor 23 are incorporated, is then provided at the opening with a cover 29 made of a same material as the case 11. The cover 29 has a centre hole 31 fitting to the rotor 23, and is provided with protrusions 32, 33 extending towards the inside of case 11 for limiting the rotary movement of rotor, which protrusions limit the right/left revolution of the rotor 23 by touching a protrusion 27 of rotor 23. To ease the mounting in of rotary throttle shaft 30, thin wall portion 35 is provided at both sides of the revolution orientator 26.

Figure 6:
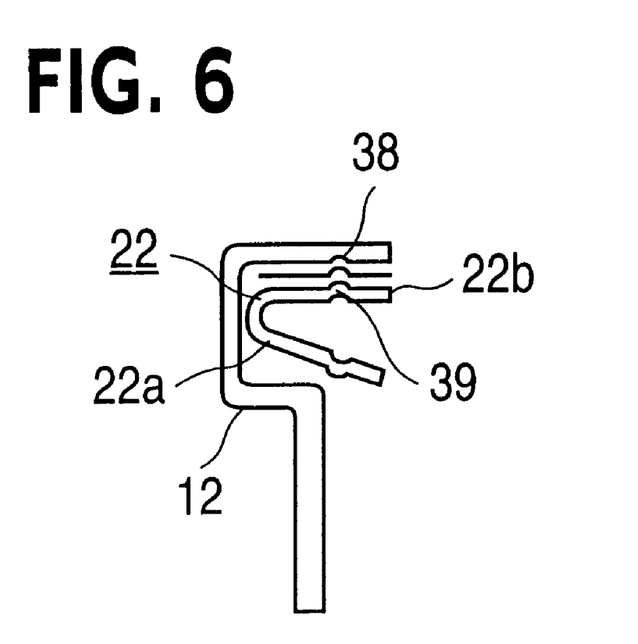
FIG. 6 and FIG. 7 are cross sectional views showing enlarged key portions of the sensor.

Said U shape pressure wedge 22 is provided with a protrusion 39 on each of the comb teeth of slit plate 22b; while each of said connector terminals 12 is provided with a hollow 38 corresponding to said protrusion 39. The substrate of resistive element 18 constituting the resistive element 21 is pinched between said connector terminal 12 and the pressure wedge, and the electrode 20 on said substrate of resistive element 18 is pressed to one end of said connector terminal 12 by said protrusion 39, thereby a sound electrical contact is ensured.

Figure 7:
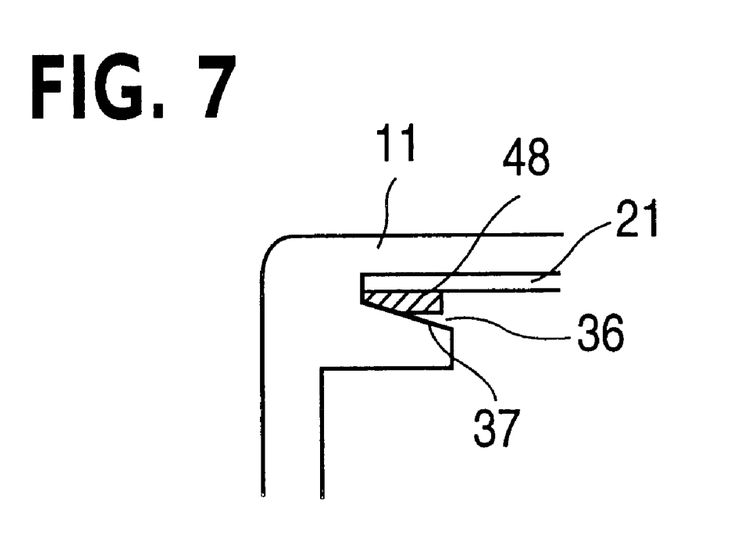

In the platform 17 disposed at the middle part of inner wall surface of said case 11 is a pocket groove 36 as shown in FIG. 7, into which pocket groove 36 the lower edge of substrate of resist element 18 constituting said resistive element 21 is fitted. Along the lower edge of substrate of resist element 18 a lane 48 which is thicker than the other part is formed by printing or other process, while in said pocket groove 36 a tapered surface 37 is provided. Because of the above configuration the lower edge of substrate of resistive element 18 is easily inserted and the resistive element 21 is fixed surely in said pocket groove 36.

At the assembly, the cover 29 is placed on case 11 with a geometric arrangement that the protrusion 27 of rotor 23 is touching and riding on the protrusion 33 of cover 29. The case 11 and the cover 29 are fixed together in this state by thermal deposition to establish initial position of brush 25 as the initial rotary position. A rotary throttle position sensor thus manufactured is then installed on a throttle body by pushing rotary throttle shaft 30 into the rotor 23 with the rotary orientation matched in the neighbourhood of an internal combustion engine. After the rotary throttle shaft 30 and the rotor 23 are completely linked together, the case 11 is fixed to throttle body 44 using the ears 16, which completes the installation. Namely, an end of the rotary throttle shaft 30 and the rotor 23 are linked together in terms of rotation by pushing the whole case 11 towards the rotary throttle shaft 30 with the flat surface 40 of rotary throttle shaft 30 matched with the revolution orientator 26. In this state, the case 11 is fixed to throttle body 44 by means of bolt etc. using the ear 16 of case 11. Under the above described configuration, the rotor 23 revolves linked to revolution of rotary throttle shaft 30 caused by a pedal action, stepping-in or idling, on an accelerator; which results in shifting of contact position of the brush 25 disposed on the rotor 23 to the resistive pattern 19 of resistive element 21; hence, a voltage is delivered to connector terminal 12 representing the contact position. The volume of fuel to be injected into an engine may be controlled using the voltage shift as signal. When the cover 29 is assembled on case 11, the protrusion 27 of rotor 23 is pressed by the protrusion 33 of cover, therefore a rotor of the invented rotary throttle position sensor as manufactured is restricted at the initial point of revolution. Which means that there is no need readjusting the rotor position when mounting it on a rotary throttle shaft in the vicinity of an internal combustion engine, and mounting work of a rotary throttle position sensor is easy. After the mounting on a rotary throttle shaft is finished, the revolving angle of the rotary throttle shaft is restricted by throttle body, and, as shown in FIG. 5(a) and FIG. 5(b), the protrusion 33 of cover 29 and the protrusion 27 of rotor 23 do not have contact; therefore, the rotor rotates smooth linked to the revolution of rotary throttle shaft.

(Embodiment 2)

Figure 8:
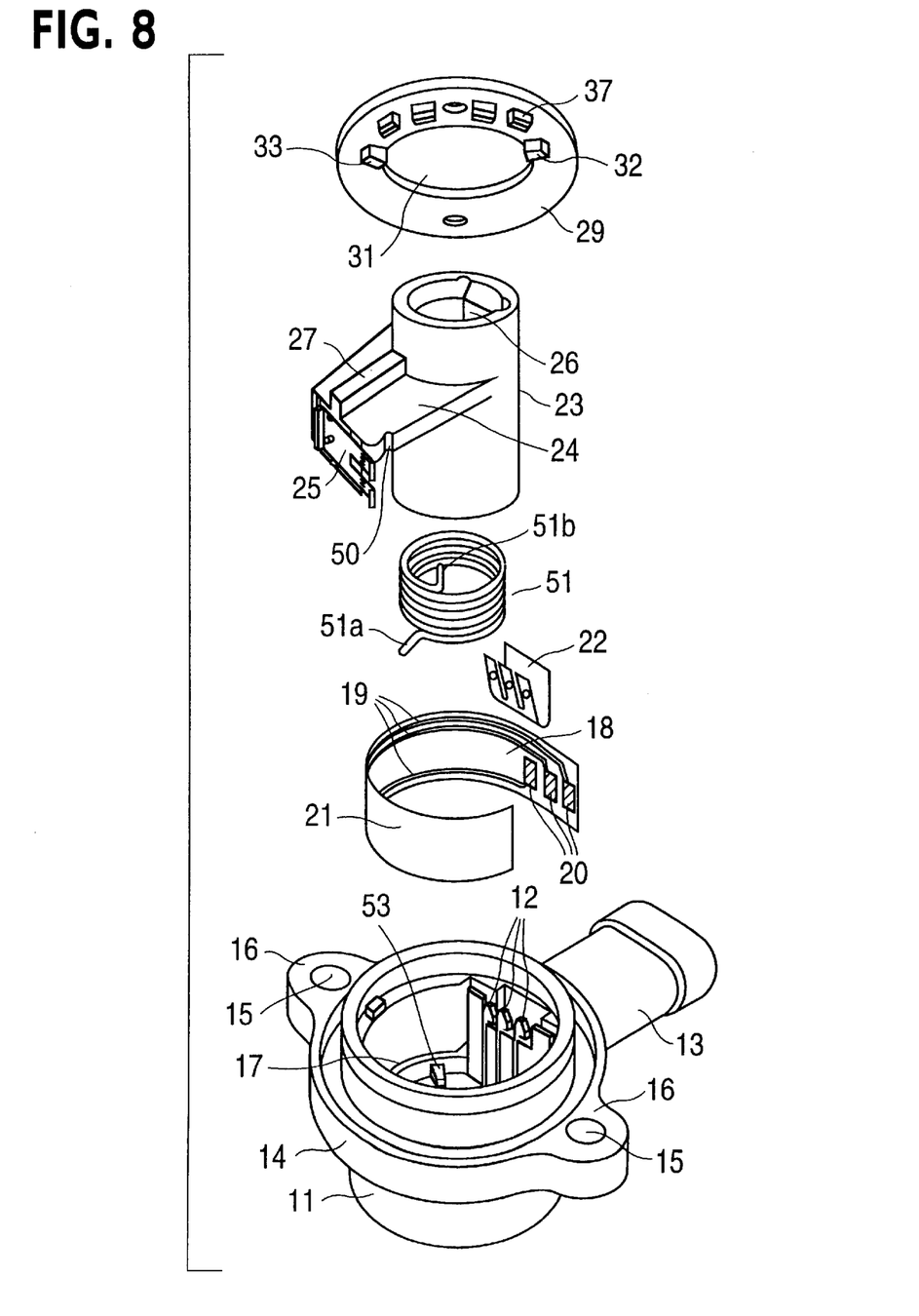
FIG. 8 is a perspective view showing an exploded rotary throttle position sensor according to a second exemplary embodiment of the present invention.

FIG. 8 is a perspective view of an exploded rotary throttle position sensor according to a second embodiment of the present invention. The sensor of FIG. 8 is different from the one illustrated in FIGS. 1 through 7 in that the former additionally has a spring 51 provided around the outer surface of rotor 23 for generating an elastic force to get said rotor 23 back. Said spring 51 is held at its one end 51a by a protrusion 53 provided on the inner bottom of said case 11 and the other end 51b is hooked by a hollow 50 provided in the support block 24 of said rotor 23. This sensor operates within a revolving range of said rotor 23 which is restricted by the protrusions 32, 33 provided on said cover 29 with respect to the protrusion 27 provided on support block 24.

In the present example, it is essential to design so that no elastic force is generated by the spring 51 for getting the rotor back while the protrusion 27 is riding over the protrusion 33 for keeping the initial position.

INDUSTRIAL APPLICABILITY

This invention presents a rotary throttle position sensor in which the rotor is fixed at initial point of revolution with ease during the manufacturing process; hence no readjustment is needed for the rotor position upon mounting the sensor on a throttle shaft. This may contribute to the ease of installation.

We claim:

1. A rotary throttle position sensor comprising:

a cylindrical case with a bottom;

a resistive element having a resistive pattern provided along an inner wall surface of the case;

a connector terminal provided on the inner wall surface of the case for an external connection to be electrically coupled to said resistive element;

a rotor means which revolves sliding on an inner bottom of said case and comprises a brush which slides upon a surface of the resistive pattern of said resistive element; and a cover provided with a protrusion for limiting a rotary movement of said rotor means by touching a protrusion provided on said rotor means, said cover having a center hole for fitting with said rotor means and configured to be attached on an open end of said case, wherein the initial point of rotation of said rotor means is determined by said cover, and said rotor means has a cylindrical shape and is provided with an opening for mechanical linkage with a rotary throttle shaft in which a flat surface is formed by partially making a wall thickness of said rotor means thicker from a mouth of opening up to a middle portion of an insertion of said rotary throttle shaft in said opening with a remaining revolving upper sector of the opening left round, and a thin wall portion is provided at both sides of the revolving upper sector for absorbing a dimensional difference with respect to the rotary throttle shaft.

2. The rotary throttle position sensor of claim 1,
wherein the inner bottom of said case is provided with a guide means for guiding a bottom of said rotor means.

3. A rotary throttle position sensor comprising:

a cylindrical case with a bottom;

a resistive element having a resistive pattern provided along an inner wall surface of the case;

a connector terminal provided on the inner wall surface of the case for an external connection to be electrically coupled to said resistive element;

a rotor means which revolves sliding on an inner bottom of said case and comprises a brush which slides upon a surface of the resistive pattern of said resistive element;

a cover provided with a protrusion for limiting a rotary movement of said rotor means by touching a protrusion provided on said rotor means, said cover having a center hole for fitting with said rotor means and configured to be attached on an open end of said case; and a pressure wedge for electrically coupling said connector terminal and said resistive element, said pressure wedge, being comprised of a flat plate disposed in the side of, and in parallel with, said inner wall surface and a slit plate having comb teeth for pressing electrodes of said resistive element to said connector terminal, said pressure wedge configured to fit between said connector terminal and said inner wall surface of said case, wherein the initial point of rotation of said rotor means is determined by said cover.

4. The rotary throttle position sensor of claim 3 wherein said comb teeth of said pressure wedge are provided each with a protrusion extending towards said connector terminal.

5. The rotary throttle position sensor of claim 4 wherein said connector terminal is provided with a hollow corresponding to said protrusion of comb teeth.

6. The rotary throttle position sensor of claim 3,
wherein said resistive element is comprised of a substrate of a resistive element in film shape, the resistive pattern and the electrode electrically coupled with the restive pattern being formed on said substrate.

7. The rotary throttle position sensor of claim 1,
wherein said resistive element is comprised of a substrate of a resistive element in film shape and said resistive pattern is formed on said substrate, and said case is provided with a platform on the inner wall surface and a pocket groove is provided in the floor of the platform, and a bottom edge of said substrate of the resistive element is inserted in said pocket groove.

8. The rotary throttle position sensor of claim 7,
wherein the bottom edge of said substrate of the resistive element is made thicker for insertion into said pocket groove.

9. The rotary throttle position sensor of claim 8,
wherein said pocket groove is provided with a tapered surface for making said substrate of the resistive element lean on the inner wall of said case.

10. A rotary throttle position sensor comprising:

a cylindrical case with a bottom having a guide portion on the bottom;

a resistive element provided along an inner wall surface of the case;

a connector terminal to be electrically coupled to an end of said resistive element;

a rotor means which is supported by said guide portion and comprises a brush which slides upon a surface of said resistive element, and is provided with a hollow in a support arm extending therefrom towards the inner wall of said case;

a spring hooked by the hollow of said rotor and a protrusion provided on the bottom of s aid case; and a cover provided with a protrusion for limiting a rotary movement of said rotor means, said cover having a center hole for fitting with said rotor means and configured to be attached on an open end of said case, wherein said rotor means has a cylindrical shape and is provided with an opening for mechanical linkage with a throttle shaft, in which a flat surface is formed by partially making a wall thickness of said rotor means thicker from a mouth of the opening up to a middle position of an insertion of said throttle shaft in said opening with a revolving upper sector of the opening left round, a thin wall portion is provided at both sides of the revolving upper sector for absorbing a dimensional difference with respect to the throttle shaft.

11. A rotary throttle position sensor comprising:

a cylindrical case with a bottom having a guide portion on the bottom;

a resistive element provided along an inner wall surface of the case;

a connector terminal to be electrically coupled to an end of said resistive element;

a rotor means which is supported by said guide portion and comprises a brush which slides upon a surface of said resistive element, and is provided with a hollow in a support arm extending therefrom towards the inner wall of said case;

a spring hooked by the hollow of said rotor and a protrusion provided on the bottom of said case;

a cover provided with a protrusion for limiting a rotary movement of said rotor means, said cover having a center hole for fitting with said rotor means and configured to be attached on an open end of said case; and a pressure wedge for electrically coupling said connector terminal and said resistive element, said pressure wedge, being comprised of a flat plate disposed in the side of, and in a parallel with, said inner wall surface and a slit plate having comb teeth for pressing electrodes of said resistive element to said connector terminal, said pressure wedge being configured to fit between said connector terminal and said inner wall surface of said case.

12. The rotary throttle position sensor of claim 11 wherein said comb teeth of said pressure wedge are provided each with a protrusion extending towards said connector terminal.

13. The rotary throttle position sensor of claim 11,
wherein said resistive element is comprised of a substrate of a resistive element in film shape and resistive patterns, the resistive patterns and the electrodes electrically coupled with the resistive patterns are formed on the substrate.

14. The rotary throttle position sensor of claim 10,
wherein said resistive element is comprised of a substrate of a resistive element in film shape and resistive patterns formed thereon, said case is provided with a platform on the inner wall surface and a pocket groove is provided in the floor of the platform, and a bottom edge of said substrate of the resistive element is inserted in said pocket groove.

15. The rotary throttle position sensor of claim 14,
wherein the bottom edge of said substrate of the resistive element is made thicker for insertion into said pocket groove.

16. The rotary throttle position sensor of claim 3, wherein the inner bottom of said case is provided with a guide means for guiding a bottom of said rotor means.

17. The rotary throttle position sensor of claim 3, wherein
said resistive element is comprised of a substrate of a resistive element in film shape and said resistive pattern is formed on said substrate, and said case is provided with a platform on the inner wall surface and a pocket groove is provided in the floor of the platform, and a bottom edge of said substrate of the resistive element is inserted in said pocket groove.

18. The rotary throttle position sensor of claim 17, wherein the bottom edge of said substrate of the resistive element is made thicker for insertion into said pocket groove.

19. The rotary throttle position sensor of claim 18, wherein said pocket groove is provided with a tapered surface for making said substrate of the resistive element lean on the inner wall of said case.

20. The rotary throttle position sensor of claim 11, wherein said resistive element is comprised of a substrate of a resistive element in film shape and said resistive pattern is formed on said substrate, and said case is provided with a platform on the inner wall surface and a pocket groove is provided in the floor of the platform, and a bottom edge of said substrate of the resistive element is inserted in said pocket groove.

21. The rotary throttle position sensor of claim 20, wherein the bottom edge of said substrate of the resistive element is made thicker for insertion into said pocket groove.

* * * * *